United States Patent [19]
Kobayashi et al.

[11] Patent Number: 5,117,136
[45] Date of Patent: May 26, 1992

[54] LINEAR MOTOR SUPPORTING APPARATUS FOR VEHICLES

[75] Inventors: Noboru Kobayashi; Yukio Uozumi, both of Hyogo, Japan

[73] Assignee: Kawasaki Jukogyo Kabushiki Kaisha, Kobe, Japan

[21] Appl. No.: 443,310

[22] Filed: Nov. 30, 1989

[30] Foreign Application Priority Data

Dec. 2, 1988 [JP] Japan .................. 63-306618

[51] Int. Cl.⁵ ........................................... H02K 41/00
[52] U.S. Cl. ................................... 310/12; 318/135; 104/293
[58] Field of Search .................. 310/12; 318/135; 104/287, 288, 290, 292, 293

[56] References Cited

U.S. PATENT DOCUMENTS 3,800,708  4/1974  English et al. ............... 104/293
3,845,721  11/1974  Wagner ...................... 104/148 LM

FOREIGN PATENT DOCUMENTS 1275187  5/1972  United Kingdom.
1558674  1/1980  United Kingdom.

Primary Examiner—Steven L. Stephan
Assistant Examiner—Judson H. Jones
Attorney, Agent, or Firm—Schwartz & Weinrieb

[57] ABSTRACT

Linear motor supporting apparatus are mounted upon the front and rear portions of each bogie of a vehicle so as to maintain the predetermined distance defined between an on-board coil and a ground stator, the on-board coil and the ground stator together constituting the linear-induction motor. The linear motor supporting apparatus incorporates a servo device which regulates the vertical position of the on-board coil in accordance with the contour of the ground stator so as to maintain the on-board-coil-to-ground-stator distance at the predetermined value. The servo device consists of a valve body, a valve box, and a servo device body. The valve body is secured to a sensor member, which runs upon and is maintained in contact with the ground stator. The valve box is secured to the on-board coil. The servo device body is mounted through means of a spring to the bogie. The ground stator may have some laying errors and there may be variations in its height. When the sensor member during operation of the vehicle is elevated due to height variations of the ground stator, the valve body move upwardly causing, through means of hydraulic pressure, the valve box to follow its upward motion. This in turn causes the on-board coil, which is integral with the valve box, to move upwardly thus maintaining the distance defined between the on-board coil and the ground stator constant.

12 Claims, 6 Drawing Sheets

LINEAR MOTOR SUPPORTING APPARATUS FOR VEHICLES

BACKGROUND OF THE INVENTION

1. Field of the Invention

The present invention relates to an apparatus for supporting a linear-induction motor used for propelling vehicles such as, for example, railway cars.

2. Description of the Prior Art

In a linear motor-propelled railroad train system whose track facility consists of rails upon which the train travels and a linear motor reaction plate, there are usually present some dimenstional errors in laying the rails and the reaction plate and their combined relative errors become large. In addition, these errors result in variations in the distance defined between the primary coil and the reaction plate of the linear motor. Furthermore, in order to keep the primary coil upon the bogie from contacting the reaction plate, there is provided a standard gap of approximately ten millimeters between them. In order to maintain this gap, accurate laying work and also frequent adjustments are required, making the system costly.

The gap of ten millimeters provided between the primary coil and the reaction plate is very large when compared to the gap of one or two millimeters formed between the armature and the stator of the rotary motor. The large gap reduces the efficiency of the linear motor.

In order to install the linear motor, a suitable structure is proposed in Japanese Unexamined Publication No. 64251/1987, which has a dedicated support wheel for rendering the gap small and constant. In this prior art system, the primary coil is supported by means of the gap-setting support wheel, which rolls along both sides of the reaction plate which is laid upon the ground. Although this construction is simple, there is a drawback that the support wheel is acted upon means of the attractive force of the linear motor and thus must be strong enough to withstand that force.

OBJECT OF THE INVENTION

An object of the present invention is to provide a linear motor supporting apparatus for vehicles, which can render small and maintain the gap defined between the on-board coil of the linear motor such as, for example, the primary coil and the ground stator—another constituent member of the linear motor—such as, for example, the reaction plate with its inherent laying errors, which can minimize any reduction in the linear motor efficiency without using the linear motor support wheel, which can withstand high loads without requiring special work in order to enhance the laying accuracy of the reaction plate and rails, or maintenance work in order to maintain the high level of dimensional accuracy of the reaction plate and rails.

SUMMARY OF THE INVENTION

In order to achieve the above objective, the linear motor supporting apparatus according to this invention comprises: an on-board coil mounted upon a bogie; a ground stator laid upon the ground along the track upon which the vehicles travel, the on-board coil and the ground stator together comprising a linear-induction motor; a means for measuring the distance between the on-board coil and the ground stator, the distance measuring means being mounted upon the bogie; and a means for vertically driving the on-board coil in response to an output of the distance measuring means so as to maintain the distance between the on-board coil and the ground stator at a predetermined value.

The apparatus of the invention also comprises: an on-board coil mounted upon a bogie; a ground stator laid upon the ground along the track upon which the vehicles travel, the on-board coil and the ground stator together comprising a linear-induction motor; a sensor member disposed in contact with the ground stator and adapted to move upwardly or downwardly in accordance with the contour of the ground stator; and a servo device, the servo device comprising: a valve body connected to the sensor member; a valve box secured to the on-board coil, the valve box accommodating the valve body in such a way that the valve body can be moved vertically therewithin; and a servo device body for accommodating the valve box in such a way that the valve box can be moved vertically therewithin, the servo device body being mounted upon the bogie and adapted to cause, through means of hydraulic pressure, the valve box to move upwardly or downwardly in accordance with the vertical motion of the valve body.

The apparatus of the invention further comprises: a means for restricting the lower-limit position of the servo device body with respect to the bogie; and a spring preloaded so as to bias the servo device body downwardly from the bogie.

Moreover, the apparatus of the invention comprises: a plurality of bogies comprising a train; an on-board coil mounted upon each bogie; a ground stator laid upon the ground along the track upon which the train travels, the on-board coil and the ground stator together comprising a linear-induction motor; a means for measuring the distance defined between the on-board coil and the ground stator, the distance measuring means being provided upon the front bogie; a means for vertically driving the on-board coil in response to a control signal so as to maintain the distance defined between the on-board coil and the ground stator at a predetermined value, the drive means being provided within each bogie; a means for measuring the speed of the train; and a control means for receiving outputs from the distance measuring means and the speed measuring means and then applying the output of the distance measuring means to the drive means as a control signal with a time delay of $T = L/V$ where V is the speed of the train and L is the distance in the direction of travel defined between the distance measuring means and the drive means.

According to this invention, the on-board coil such as, for example, the primary coil is mounted upon the bogie and the ground stator such as, for example, the reaction plate is laid upon the ground along the track, to so as form a linear motor. The distance defined between the on-board coil and the ground stator is measured, and the on-board coil is vertically moved so that the distance is maintained at a predetermined value. This eliminates the need to improve the laying accuracy of the ground stator and of the rails upon which the bogies travel, which conventionally was at an unnecessarily high level. The invention also allows the distance defined between the on-board coil and the ground stator to be set as small as possible, thereby improving the efficiency of the linear motor. Furthermore, since the on-board coil is mounted upon the bogie, there is no need to provide a wheel upon which the on-board coil is to be supported.

According to the invention, the distance defined between the on-board coil and the ground stator is measured by means of a sensor member that moves upwardly and downwardly in contact with the ground stator and, according to the displacement of the sensor member, the on-board coil position is vertically regulated by means of the servo device.

Moreover, according to the invention, a plurality of bogies are connected together so as to form a single train with a distance measuring means provided only upon the front bogie. The second and succeeding bogies disposed behind the front bogie carrying the distance measuring means are given, with a time delay T, a control signal for maintaining the on-board-coil-to-ground-stator distance at a predetermined value. This construction needs only one distance measuring means. It is also possible to provide a means for driving the on-board coil upwardly and downwardly in connection with the distance measuring means mounted upon the first bogie.

BRIEF DESCRIPTION OF THE DRAWINGS

Various other objects, features, and attendant advantages of the present invention will become more fully appreciated from the following detailed description, when considered in connection with the accompanying drawings, in which like reference characters designate like or corresponding parts throughout the several views, and wherein.

DESCRIPTION OF THE PREFERRED EMBODIMENTS

Figure 1:
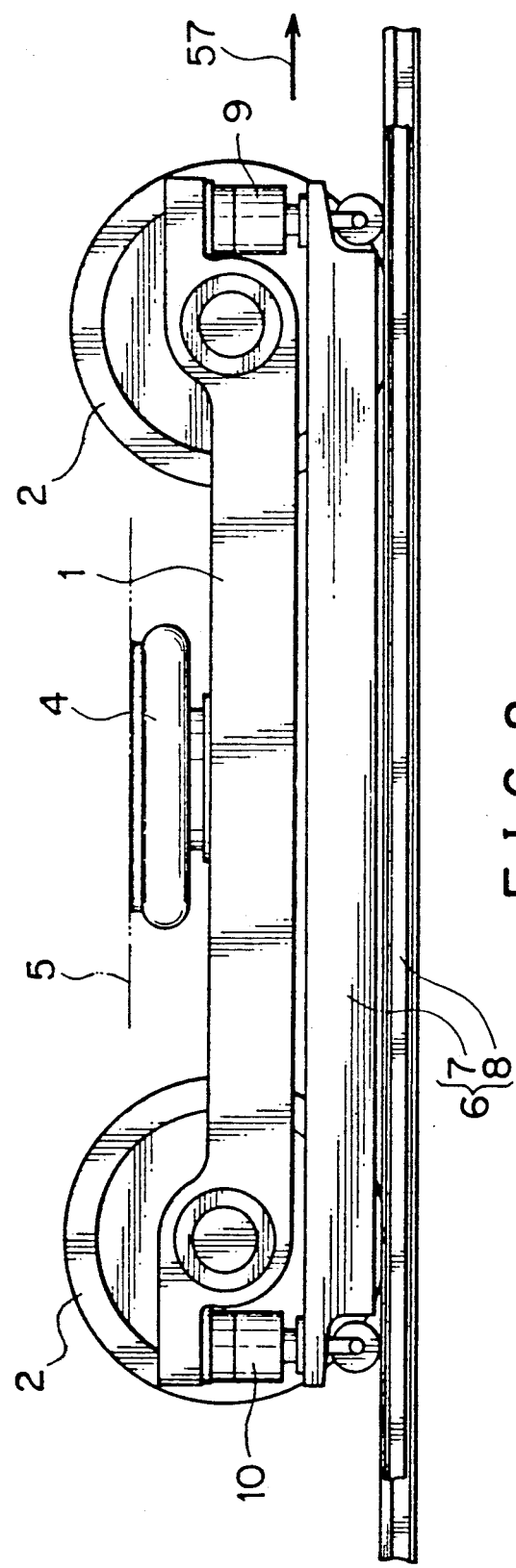
FIG. 1 is a side elevational view of a part of one embodiment of this invention as applied to a railroad bogie.
Figure 2:
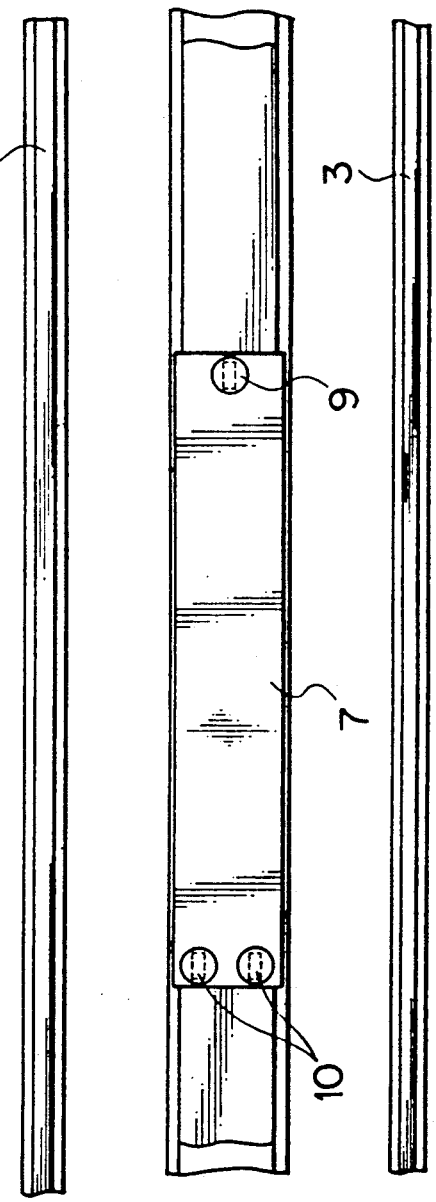
FIG. 2 is a simplified plan view of the embodiment shown in FIG. 1.

FIG. 1 illustrates a simplified side elevational views of a part of one embodiment of this invention. FIG. 2 is a simplified plan view of the components of FIG. 1. A bogie or truck 1 is mounted, through means of springs, with wheels 2 that travel upon a pair of rails 3 laid upon the ground in the direction of travel 57. Mounted upon the bogies 1 through means of air springs 4 is a vehicle body 5 that carries passengers. The bogies 1 and the vehicle body 5 constitute the vehicle. Underneath the bogie 1 there is provided an on-board primary coil 7, which comprises a part of the linear-induction motor 6. Immediately below the primary coil 7 there is disposed a reaction plate 8 laid upon the the ground in the direction of travel 57. The on-board primary coil 7 is mounted upon the bogie 1 through means of three servo devices, of which one 9 is installed at the front of the bogie with respect to the direction of travel and two 10 are mounted at the rear of the bogie and are laterally spaced apart. The on-board primary coil 7 magnetically interacts with the reaction plate 8 so as to generate a force to propel the bogie 1 forwardly. Displacement between the primary coil 7 and the bogie 1 along the direction of travel is blocked by a means not shown. In FIG. 2, the bogie 1 is omitted.

Figure 3:
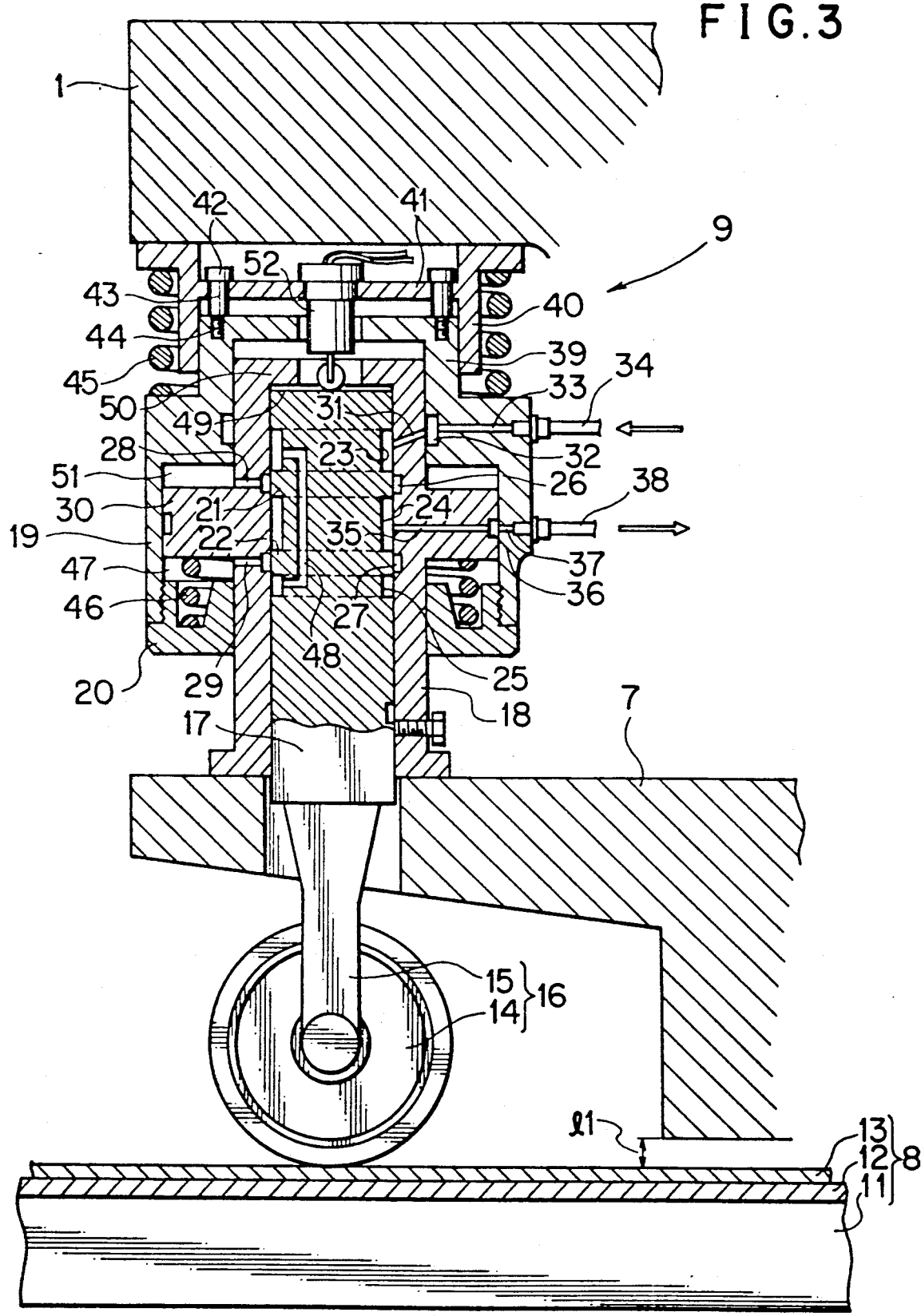
FIG. 3 is a cross-sectional view of a servo device utilized within the system of the present invention.

FIG. 3 is a cross-sectional view of the servo device 9. As shown in the figure, the reaction plate 8 consists of a rigid base material 11, a plate 12 of ferromagnetic material placed upon the base material 11, and a plate 13 made of a metal, such as, for example, aluminum or copper which are not ferromagnetic materials, these three components being secured together.

A wheel 14 rolling or travelling upon the upper surface of the reaction plate 8 and a support rod 15 that rotatably supports the wheel 14 constitute a sensor member 16, which measures the distance l1 between defined the primary coil 7 and the reaction plate 8.

The support rod 15 is rigidly connected to a vertically movable valve body 17 that has a vertical axis which is coincident with the vertical axis of the servo device 9. The valve body 17 is installed inside a valve box 18 which can be vertically displaced. The valve box 18 within turn is accommodated in a servo device body 19 in such a manner that it can be moved vertically within the body 19. The body 19 has an end member 20 securely attached to the lower end thereof through means of threads. The valve body 17 has lands 21, 22 spaced apart in the axial direction, with annular small-diameter portions 23, 24, 25 formed axially adjacent to the lands. The valve box 18 is formed with annular grooves 26, 27 corresponding in their axial positions to the lands 21, 22, and these annular grooves 26, 27 are connected with oil holes 28, 29. The valve box 18 is formed with a piston portion 30 at an axial position defined between the oil holes 28 and 29. The servo device body 19 is formed with an annular groove 32, which communicates with an oil hole 31 formed within the valve box 18 and corresponding to the axial position of the small-diameter portion 23 of the valve body 17. The body 19 is also formed with an oil passage 33 communicating with the annular groove 32. The oil passage 33 is supplied with pressurized oil from a conduit 34. The body 19 has another oil passage 37, which is connected through means of an annular groove 36 to an oil hole 35 formed within the piston portion 30, the oil hole 35 communicating with a space defined between the small-diameter portion 24 of the valve body 17 and the piston 30. The oil passage 37 is connected with a conduit 38, which in turn is connected to an oil tank. The valve body 17 has an axially extending oil passage 48 formed therein that fluidically connects the small-diameter portions 23 and 25 with each other.

The upper end portion 39 of the body 19 is cylindrical and is disposed within a guide cylinder 40 secured to the bogie 1 in such a way that portion 39 is vertically movable with respect thereto. The guide cylinder 40 has a support plate 41 integrally formed therewith. Support members 43 having a large-diameter head 42 are vertically moveable with respect to the support plate 41, and their lower end portion 44 are threaded and screwed into the upper end portion 39 of the body 19. A spring 45 encloses the guide cylinder 40 and the upper end portion 39 of the body 19 and is preloaded so as to bias the body 19 downwardly from the bogie 1. Each head 42 of the support member 43 engages the support plate 41 thus blocking further downward displacement of the body 19 so as to restrict the lower limit position of the body 19 with respect to the bogie 1.

Another spring 46 is installed within the body 19 between the end member 20 and the piston portion 30 so as to bias the valve box 18 upwardly with respect to the body 19.

The axial length of the land 21 of the valve body 17 (as seen in the vertical direction of FIG. 3) is slightly larger than the axial length of the annular groove 26 so that a bind zone is formed. This construction is also employed for the other land 22 and the corresponding annular groove 27. In the state of FIG. 3, the lands 21, 22 close the annular grooves 26, 27.

Let us consider a situation in which, during operation, the sensor member 16 is raised from the state of FIG. 3 due to laying errors of the reaction plate 8. As the valve body 17 moves upwardly, the working oil from the conduit 34 flows through the oil passage 33 and annular groove 32 within the body 19, the oil passage 31 within the valve box 18, the annular space defined between the valve box 18 and the small-diameter portion 23 of the valve body 17, and the axially extending oil passage 48 formed within the valve body 17 and into the annular space defined between the valve box 18 and the small-diameter portion 25 of the valve body 17, from which the oil further flows through the oil passage 29 and into a chamber 47 where the spring 46 is installed. As a result, the piston portion 30 is pushed upwardly by means of the hydraulic pressure. The piston portion 30 moves upwardly following the motion of the valve body 17 until the annular grooves 26, 27 are again closed means of the lands 21, 22. Therefore, the upward displacement of the valve box 18 equals the upward displacement of the valve body 17. As the valve box 18 moves upwardly, the primary coil 7 which is integral with the valve box 18 also moves upwardly. In this way, the primary coil 7 follows the vertical variations in the reaction plate 8, thus keeping the distance l1 between the primary coil 7 and the reaction plate 8 constant. The reaction force of the servo device is sustained by means of the bogie 1 through means of the body 19, spring 45 and support members 43.

Should there be an abnormal projection disposed upon the reaction plate 8 or when the primary coil 7 comes into contact with the reaction plate 8, the servo device 9 may not be able to respond quickly enough. In this case, the upper end portion 49 of the valve body 17 may abut the upper end portion 50 of the valve box 18, the oil pressure within a chamber 51 defined between the body 19 and the upper side of the piston portion 30 may increase, or the upper end portion of the valve box 18 may strike the upper end portion of the body 19, exerting an excessive force upon the sensor member 16 and the valve body 17. The spring 45 solves this problem. When the valve box 18 abruptly moves upwardly, the body 19 also moves upwardly compressing the spring 45. The spring 45 is preloaded and, when applied with a compressive force in excess of the preloaded force, is compressed. If the spring 45 was not provided with any precompression, it would be easily compressed even with a slight vibrational load, making the servo device unstable. With this construction, the sensor member 16 and the valve body 17 are prevented from being burdened with an excessive amount of force.

When there is oil leakage, the reduced oil pressure will render it impossible for the servo device 9 to drive the valve box 18 in accordance with the motion of the valve body 17. In such a case, the hydraulic oil within the chamber 51 above the piston portion 30 is discharged through means of the oil passage 28 and the force of the spring 46 causes the valve box 18 and therefore the primary coil 7 to move upwardly, thus preventing the sensor member 16 from being burdened with the reaction force of supporting the primary coil 7. As for the remaining servo devices 10, their constructions are similar to that of the above servo device 9. The combined use of these three servo devices 9, 10 for a single primary coil 7 ensures that a torsional moment is prevented from being applied to the primary coil 7 when there is a twist present within the reaction plate 8, or when there is a relative deviation between the rails 3 and the reaction plate 8, or when the vehicle is travelling upon a curved track. As another embodiment of the invention, it is possible to provide four or more servo devices 9, 10. When four servo devices are used, it is necessary to make the forces between any two servo devices equal by means of an equalizer that operates as a balance mechanism.

In accordance with another embodiment of the invention, there is provided a displacement sensor 52 in connection with the servo device 9. The displacement sensor 52 is rigidly mounted to the support plate 41 of the guide cylinder 40 and passes through the valve box 18 and the body 19. The displacement sensor 52 is intended to detect the amount of vertical displacement of the valve body 17 relative to the bogie 1 and convert it into an electrical signal. The distance l1 defined between the primary coil 7 and the reaction plate 8 can therefore be measured by means of the displacement sensor 52.

Figure 4:
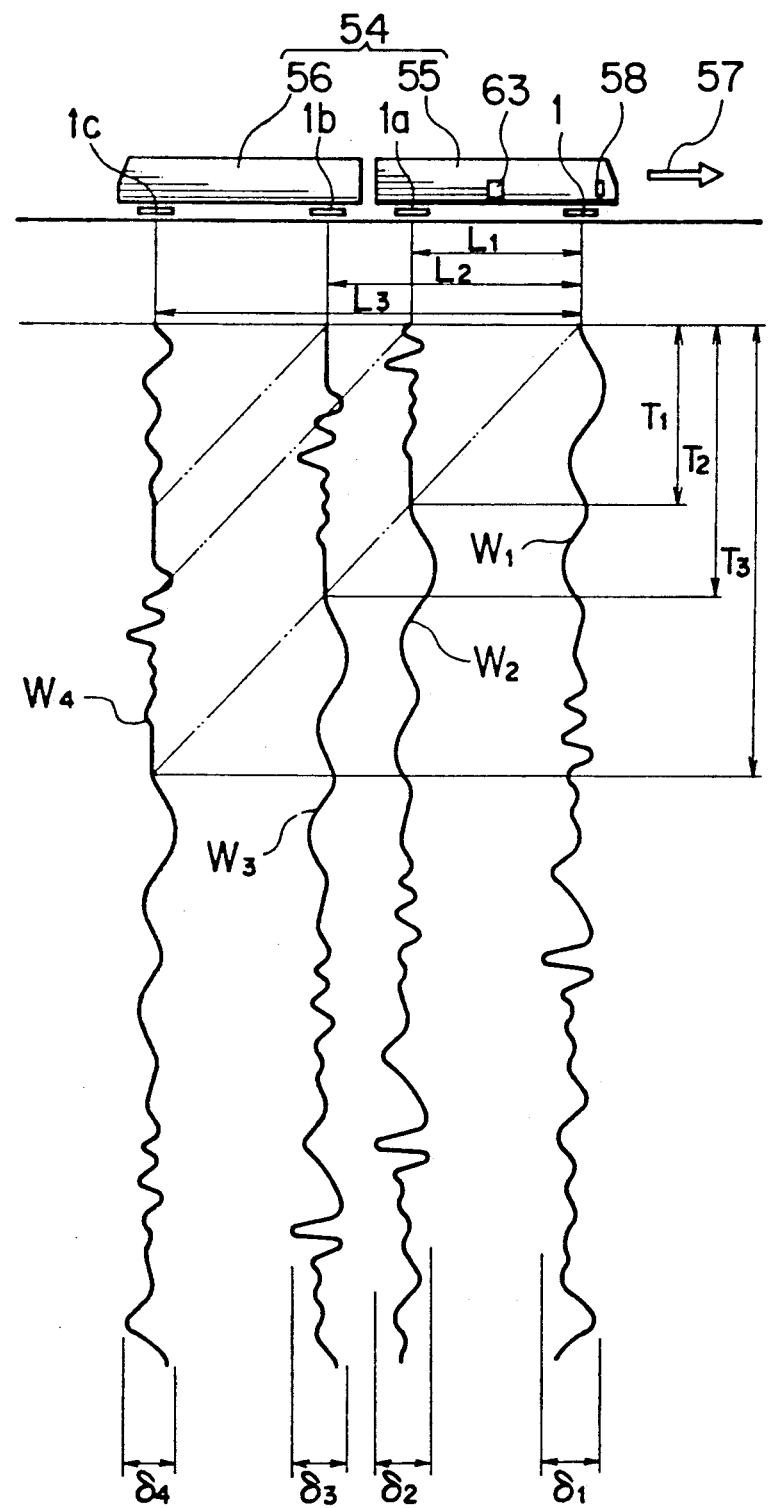
FIG. 4 is a simplified schematic diagram of another embodiment of this invention.

FIG. 4 is a simplified schematic diagram of yet another embodiment of this invention when the apparatus is equipped with the displacement sensor 52. A train 54 consists of a plurality of cars 55, 56 (in this case two) connected together and travels in the direction of arrow 57. At the front (with respect to the direction of travel) of the car 55, the bogie 1, which has been described with reference to FIGS. 1 to 3, is installed. At the rear of the car 55 another bogie 1a is provided. The second car 56 is provided with bogies 1b, 1c. In this embodiment, the output of the displacement sensor 52 within the servo device 9 for the bogie 1 has a waveform W1 as shown in FIG. 4.

Figure 5:
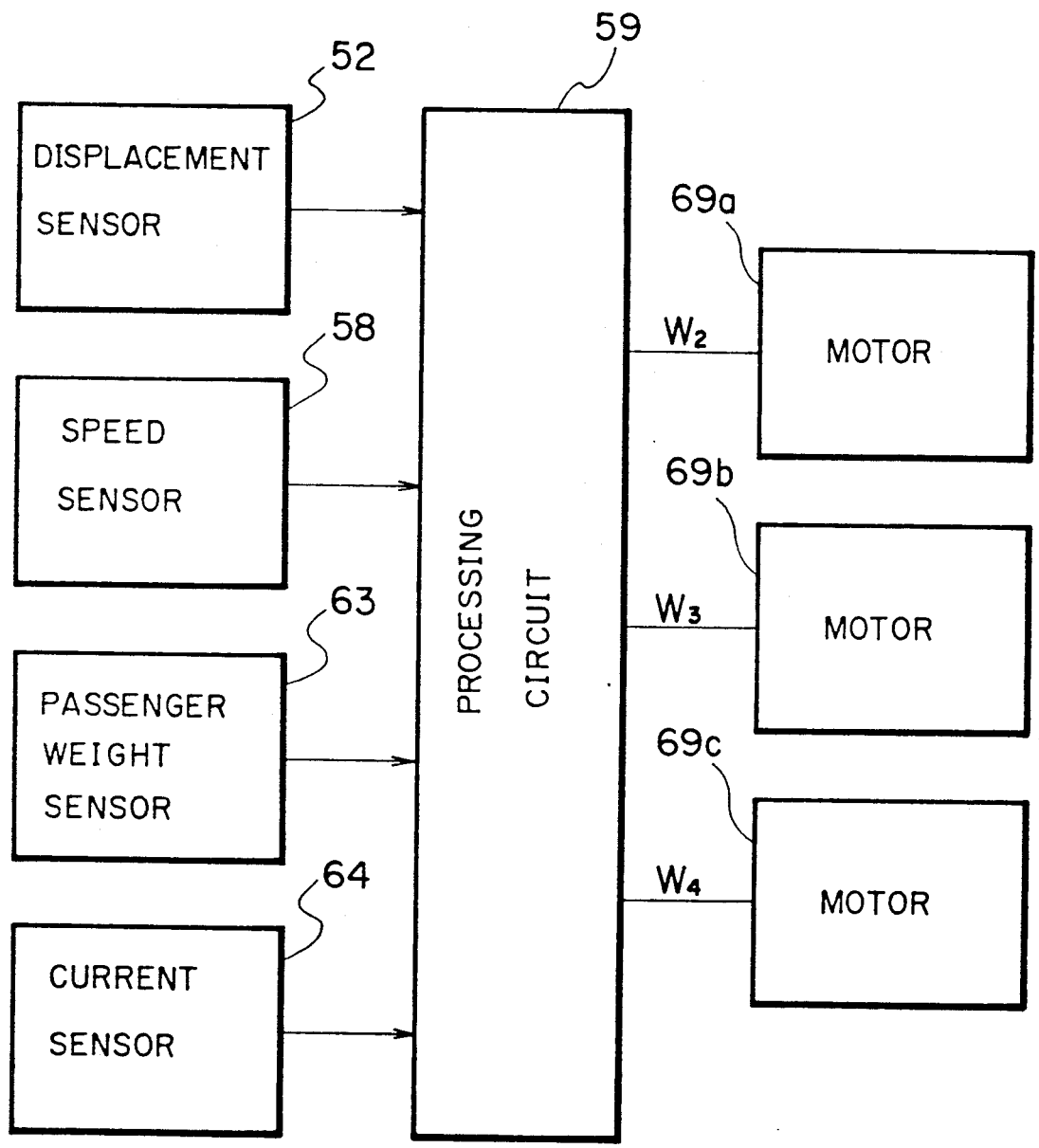
FIG. 5 is a block diagram showing the electrical composition of the embodiment shown in FIG. 4.

FIG. 5 is a block diagram showing the electrical system of the embodiment of FIG. 4. The speed of the train 54 is detected by means of a speed sensor 58. The outputs of the displacement sensor 52 and the speed sensor 58 are fed to a processing circuit 59, which comprises a microcomputer. The processing circuit 59 then drives motors 69a, 69b, 69c which are installed upon the bogies 1a, 1b, 1c, respectively. The control signals applied to these motors 69a, 69b, 69c are indicated by means of the reference symbols W2, W3 and W4 which are the same signals or waveforms illustrated in FIG. 4. Let L1 stand for the distance defined between the displacement sensor 52 of the bogie 1 and the corresponding position of the bogie 1a. Likewise, let L2 and L3 stand for the distances defined between the displacement sensor 52 of the bogie 1 and the corresponding positions of the bogies 1b, 1c. Also let the speed of the train detected by means of the speed sensor 58 be V. The waveforms W2, W3, W4 are delayed from the waveform W1 of the displacement sensor 52 by means of the times T1, T2, T3, respectively before being applied to the motors 69a, 69b, 69c.

$$T1 = \frac{L1}{l'} \quad (1)$$

$$T2 = \frac{L2}{l'} \quad (2)$$

$$T3 = \frac{L3}{l'} \quad (3)$$

Figure 6:
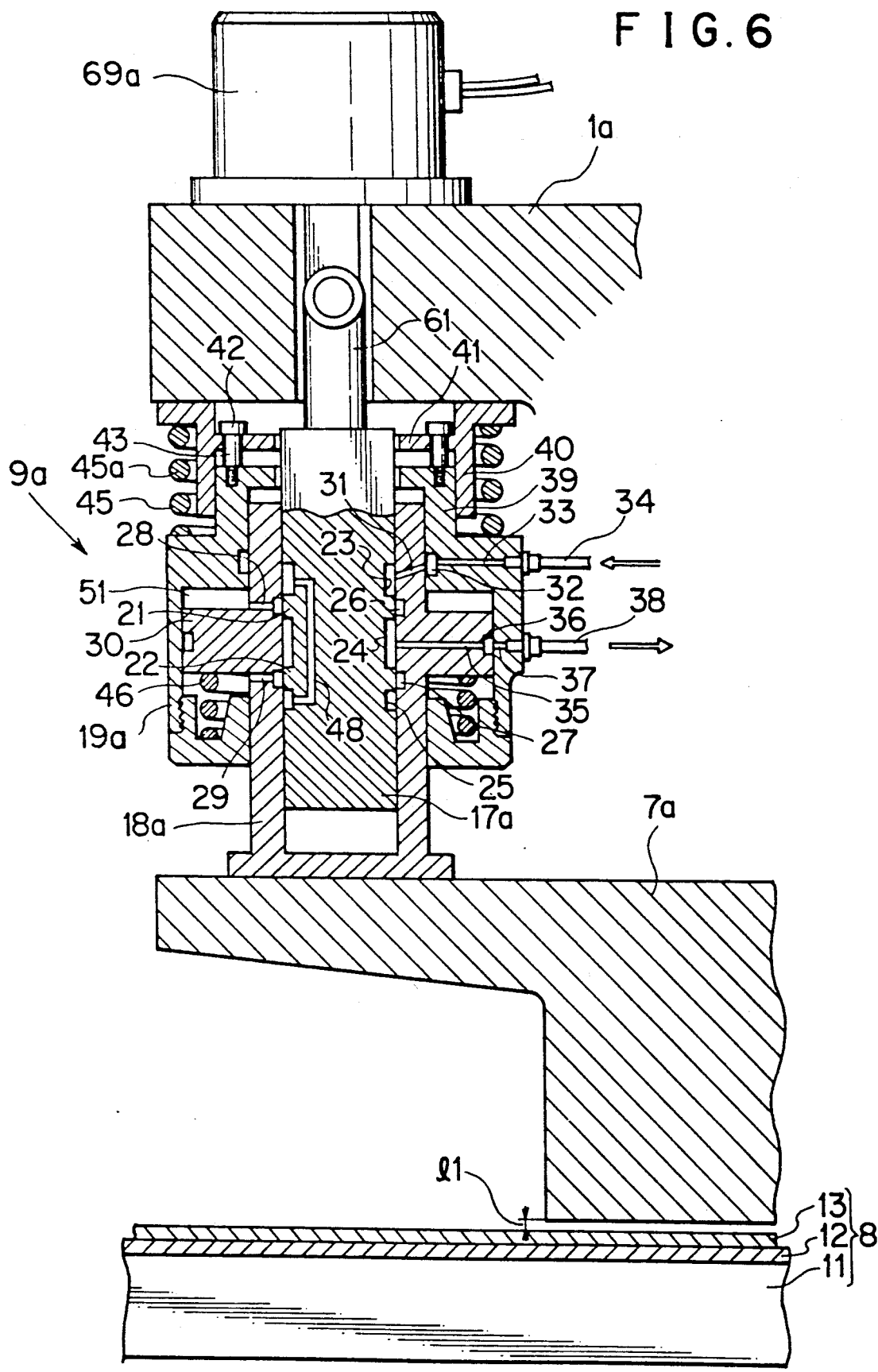
FIG. 6 is a cross-sectional view of a servo device employed within the embodiment of FIGS. 4 and 5.

FIG. 6 is a cross-sectional view of a servo device 9a mounted upon the bogie 1a and which corresponds to the servo device 9 upon the bogie 1. This servo device 9a resembles the abovementioned servo device 9 of FIG. 3, with the corresponding parts thereof represented by means of the same numerals attached with a subscript a. It should be noted that in this embodiment the valve body 17a is connected to a drive shaft 61 which is vertically driven by means of the motor 69a.

Figure 7:
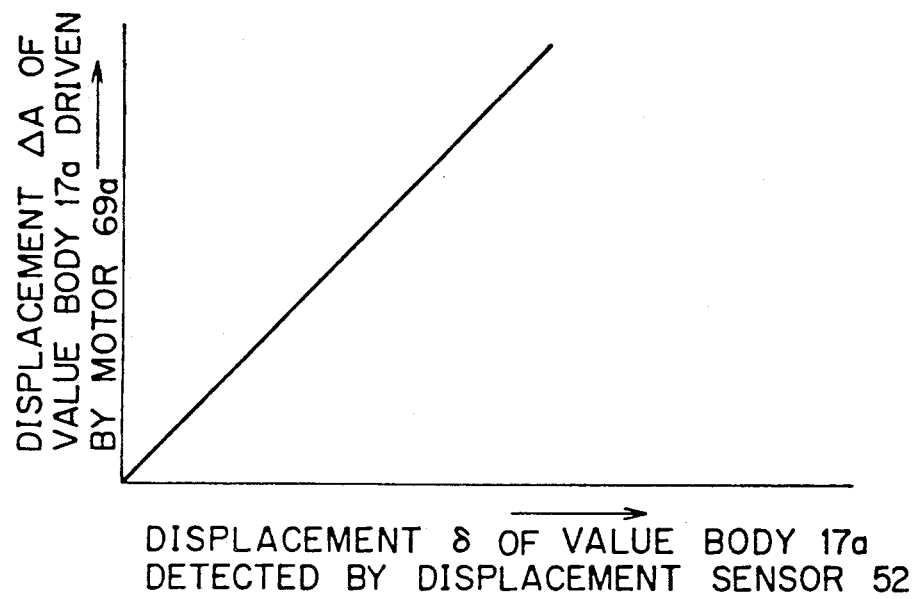
FIG. 7 is a graph explaining the operation of a processing circuit of FIG. 5.

FIG. 7 is a graph showing the relationship defined between a displacement $\Delta A$ of the valve body 17a driven by means of the motor 69a, which is controlled by means of the processing circuit 59, and a displacement $\delta$ of the valve body 17a as detected by means of the displacement sensor 52 with respect to the state shown in FIG. 3, which is taken as a reference. The displacement $\delta$ detected by means of the displacement sensor 52 is proportional to the displacement $\Delta A$ of the valve body 17a when driven by means of the motor 69a. It should be noted, however, that the control signal for the motor 69a for producing the displacement $\Delta A$ is delayed by means of the time duration T1 from the moment the displacement sensor 52 has detected the deviation. The spring 45a prevents the primary coil 7a from being burdened with an excessive amount of force when the primary coil 7a contacts the reaction plate 8. The time duration T1 may include such delay factors as the time required by for the hydraulic oil to flow into the servo device 9a and the operational delay of the motor 69a. The same also applies to the time durations T2, T3.

Although the foregoing description concerns the servo device 9 for the bogie 1 and the similar servo device 9a for the bogie 1a, the same construction can be used with the servo device 10 for the bogie 1 and with respect to the similar servo device 10a for the bogie 1a. All these descriptions also apply to the bogies 1b, 1c.

Figure 8:
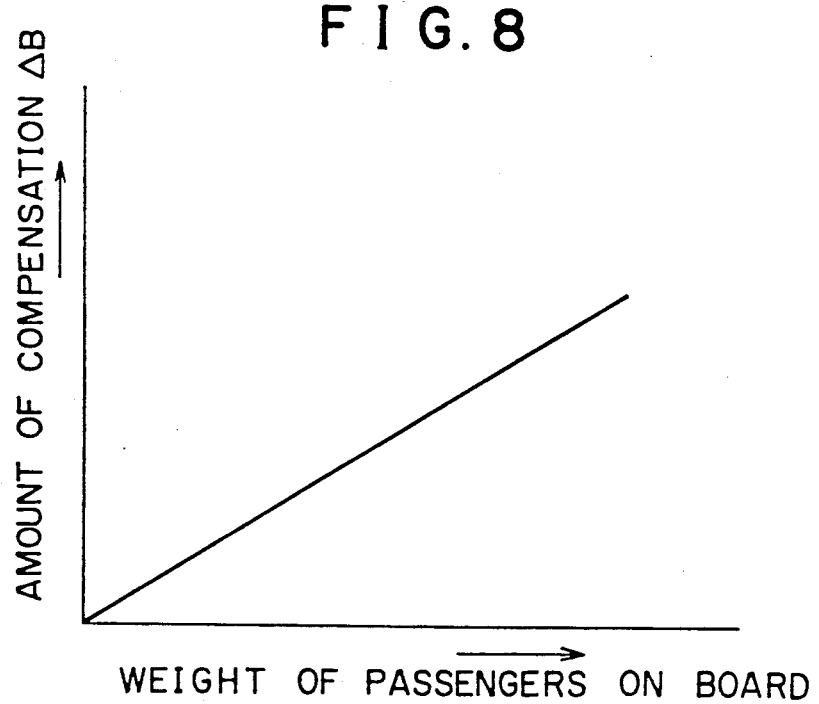
FIG. 8 is a graph explaining the operation of the processing circuit of another embodiment of the invention.

With these embodiments, it is possible to maintain the gap 11 defined between the primary coil 7a and the reaction plate 8 at a constant value regardless of the weight of the passengers boarding the cars 55, 56. Referring again to FIG. 5, the weight of the passengers is measured by means of the weight sensor 63 provided within the car 55. When the passenger weight or the current value changes after the first bogie has passed a given point, the second and succeeding bogies will compensate for that change when they pass the same point. These sensor signals are supplied to the processing circuit 59 which generates a control signal to be applied to the motor 69a. As shown in FIG. 8, the compensation or correction value $\Delta B$ is predetermined so as to increase in proportion to an increase in the passenger weight. The compensation value $\Delta B$ is added to the control signal, which is transmitted to the motor 69a. Then, the primary coil 7a will be shifted upwardly toward the bogie 1a, thereby maintaining the gap 11 constant.

As still another embodiment of the invention, the following compensation method is also possible. The current fed to the primary coil 7a is measured by means of a current sensor 64. When the current increases, the control signal to the motor 69a is modified so as to cause the primary coil 7a to move upwardly toward the bogie 1a. As the current of the primary coil 7a increases, the bogie 1a will be shifted downwardly by means of the magnetic attraction defined between the primary coil 7a and reaction plate 8. However, since the motor 69a causes the primary coil 7a to move upwardly toward the bogie 1a as mentioned above, the distance 11 is maintained at a constant predetermined value. The same also applies to the second car 56.

In the above embodiments, four bogies 1, 1a, 1b, 1c are used for a single train. In the case of a long train hauling many bogies, such as for example, 20 bogies, it is possible to divide them into two groups, each consisting of ten bogies and to provide a displacement sensor 52 upon the first bogie of each group in order to achieve the abovementioned compensation control characteristics. This helps simplify the construction of the servo devices.

As explained above, since this invention can maintain at a small and substantially constant value the gap defined between the on-board coil and the ground stator (reaction plate), both components of the linear-induction motor, the reduction in the linear motor efficiency can be minimized. Furthermore, even when there are variations in the distance defined between the rails upon which the bogies travel and the reaction plate, the gap defined between the on-board coil and the ground stator can be maintained constant. This eliminates the need for a complicated control system to enhance the accuracy of laying the rails and reaction plate, which in turn eliminates the maintenance service which otherwise be required and therefore such reduces the cost of the system.

Obviously, many modifications and variations of the present invention are possible in light of the foregoing teachings. It is therefore to be understood that within the scope of the appended claims, the present invention may be practiced otherwise than as specifically described herein.

What is claimed is:

1. A linear motor supporting apparatus for vehicles, comprising:

an on-board coil mounted upon a bogie of said vehicle;

a ground stator laid upon the ground along a track upon which said vehicles travel, said on-board coil and said ground stator together comprising a linear induction motor and being separated by means of a predetermined distance;

means mounted upon said bogie and disposed in contact with said ground stator for measuring said distance defined between said on-board coil and said ground stator, said distance measuring means being movable with respect to said on-board coil; and means for automatically displacing said on-board coil in response to said distance measured by said distance measuring means, as a varying input thereto, and with respect to said distance measuring means, said bogie, and said ground stator so as to have said on-board coil disposed above said ground stator at a distance which has a predetermined constant value corresponding to said predetermined distance so as not to reduce the efficiency of said linear induction motor.

2. A linear motor supporting apparatus for vehicles comprising:
an on-board coil mounted on a bogie;
a ground stator laid on the ground along a track on which the vehicles travel, the on-board coil and the ground stator together comprising a linear-induction motor;
a sensor member placed in contact with the ground stator and adapted to move upwardly or downwardly following the contour of the ground stator; and
a servo device, the servo device comprising:
a valve body connected to the sensor member;
a valve box secured to the on-board coil, the valve box accommodating the valve body in such a way that the valve body can be moved vertically therein; and
a servo device body for accommodating the valve box in such a way that the valve box can be moved vertically therein, the servo device body being mounted to the bogie and adapted to cause, by hydraulic pressure, the valve box, and the on-board coil secured thereto, to move upwardly or downwardly following the vertical motion of the valve body.

3. A linear motor supporting apparatus for vehicles, as set forth in claim 2, further comprising:
a means for restricting the lower-limit position of the servo device body with respect to the bogie; and
a spring preloaded to urge the servo device body downward from the bogie.

4. A linear motor supporting apparatus for vehicles comprising:
a plurality of bogies comprising a train;
an on-board coil mounted on each bogie;
a ground stator laid on the ground along a track on which the train travels, the on-board coil and the ground stator together comprising a linear-induction motor and being separated by means of a predetermined distance;
a means for measuring the distance between the on-board coil and the ground stator, the distance measuring means being mounted upon the front bogie of said train.
a means for automatically displacing the on-board coil in response to a control signal from said measuring means so as to keep the distance between the on-board coil and the ground stator at a predetermined constant value corresponding to said predetermined distance, the displacing means being provided upon each bogie;
a means for measuring the speed of the train; and
a control means for receiving outputs from the distance measuring means and the speed measuring means and then applying the output of the distance measuring means to the displacing means as a control signal with a time delay of $T = L/V$ where V is the speed of the train and L is the distance in the direction of travel between the distance measuring means and the drive means.

5. Apparatus as set forth in claim 1, wherein said measuring means comprises:
a roller wheel disposed in contact with said ground stator; and
a support rod rotatably mounting said roller wheel.

6. Apparatus as set forth in claim 5, wherein said automatically displacing means comprises:
a valve body integrally formed with said support rod, oil passageway means being formed within said valve body; and
a valve box fixedly secured to said on-board coil and including a piston portion for actuation by means of pressurized oil transmitted thereto by said oil passageway means of said valve body.

7. Apparatus as set forth in claim 1, wherein:
said automatically displacing means comprises a servo mechanism; and
each of said bogies of said vehicle has a first one of said servo mechanisms disposed at a front portion of said bogie, and a pair of laterally spaced servo mechanisms disposed at a rear portion of said bogie.

8. Apparatus as set forth in claim 4, wherein:
said distance measuring means comprises a displacement sensor means disposed in contact with said ground stator for detecting the amount of vertical displacement of said distance measuring means relative to said bogie and for generating said control signal in response to said detected amount of vertical displacement of said distance measuring means; and
said automatically displacing means comprises drive motors for causing displacement of said on-board coils upon said bogies.

9. Apparatus as set forth in claim 8, wherein said automatically displacing means comprises:
a drive shaft respectively connected to one of said drive motors;
a valve body integrally formed with said drive shaft, oil passageway means being formed within said valve body; and
a valve box fixedly secured to said on-board coil and including a piston portion for actuation by means of pressurized oil transmitted thereto by said oil passageway means of said valve body 10. Apparatus as set forth in claim 2, wherein said sensor member comprises:
a roller wheel disposed in contact with said ground stator; and
a support rod rotatably mounting said roller wheel.

11. Apparatus as set forth in claim 2, wherein:
said bogie is provided with one of said servo devices at a front end portion thereof, and a pair of laterally spaced servo devices upon rear end portions thereof.

12. Apparatus as set forth in claim 2, wherein:
said valve body has oil passageway means formed therein; and
said valve box includes a piston portion for actuation by means of pressurized oil transmitted thereto by said oil passageway means of said valve body.

* * * * *